United States Patent
Bellagamba

(10) Patent No.: US 9,479,355 B2
(45) Date of Patent: Oct. 25, 2016

(54) VPLS N-PE REDUNDANCY WITH STP ISOLATION

(71) Applicant: Cisco Technology, Inc., San Jose, CA (US)

(72) Inventor: Patrice Bellagamba, Saint-Raphael (FR)

(73) Assignee: Cisco Technology, Inc., San Jose, CA (US)

( * ) Notice: Subject to any disclaimer, the term of this patent is extended or adjusted under 35 U.S.C. 154(b) by 57 days.

(21) Appl. No.: 14/255,855

(22) Filed: Apr. 17, 2014

(65) Prior Publication Data

US 2014/0226674 A1 Aug. 14, 2014

Related U.S. Application Data

(63) Continuation of application No. 12/355,668, filed on Jan. 16, 2009, now Pat. No. 8,743,677.

(51) Int. Cl.
| | |
|---|---|
| H04L 12/46 | (2006.01) |
| H04L 12/701 | (2013.01) |
| H04L 12/705 | (2013.01) |
| H04L 12/707 | (2013.01) |
| H04L 12/703 | (2013.01) |
| H04L 12/753 | (2013.01) |
| H04L 12/723 | (2013.01) |
| H04L 12/721 | (2013.01) |
| H04L 12/24 | (2006.01) |
| H04L 29/14 | (2006.01) |
| H04Q 3/00 | (2006.01) |
| H04L 1/22 | (2006.01) |
| H04Q 11/00 | (2006.01) |

(52) U.S. Cl.
CPC ............ *H04L 12/46* (2013.01); *H04L 12/462* (2013.01); *H04L 41/0654* (2013.01); *H04L 45/00* (2013.01); *H04L 45/18* (2013.01); *H04L 45/22* (2013.01); *H04L 45/28* (2013.01); *H04L 45/48* (2013.01); *H04L 45/50* (2013.01); *H04L 45/68* (2013.01); *H04L 69/40* (2013.01); *H04Q 3/0079* (2013.01); *H04L 1/22* (2013.01); *H04Q 2011/0081* (2013.01); *H04Q 2213/167* (2013.01)

(58) Field of Classification Search
None
See application file for complete search history.

(56) References Cited

U.S. PATENT DOCUMENTS

| | | | | |
|---|---|---|---|---|
| 6,032,266 | A * | 2/2000 | Ichinohe | ............. H04L 41/0213 714/21 |
| 7,209,435 | B1 * | 4/2007 | Kuo et al. | ...................... 370/219 |
| 2003/0023892 | A1 * | 1/2003 | Giovanni | .......................... 714/2 |
| 2003/0208618 | A1 * | 11/2003 | Mor et al. | ..................... 709/238 |
| 2005/0147028 | A1 * | 7/2005 | Na et al. | ......................... 370/217 |
| 2005/0276215 | A1 * | 12/2005 | Kitani et al. | .................. 370/217 |
| 2006/0047851 | A1 * | 3/2006 | Voit et al. | ..................... 709/239 |
| 2007/0008982 | A1 * | 1/2007 | Voit et al. | ..................... 370/401 |

OTHER PUBLICATIONS

Cisco, "Layer 2 Extension Between Remote Data Centers Cisco Catalyst 6500 Series Virtual Switching System and L2VPNoGRE", 2008, Cisco System, Inc.*

* cited by examiner

*Primary Examiner* — Ayaz Sheikh
*Assistant Examiner* — Peter Chau

(57) ABSTRACT

In one embodiment, a system includes a first network, a second network, and a core network connecting the first network to the second network. The first network includes a first set of two or more network devices, wherein the first network has a first spanning tree associated therewith. Similarly, the second network includes a second set of two or more network devices, wherein the second network has a second spanning tree associated therewith, wherein the second spanning tree is separate from the first spanning tree.

20 Claims, 4 Drawing Sheets

VPLS N-PE REDUNDANCY WITH STP ISOLATION

RELATED APPLICATIONS

This application is a continuation of U.S. patent application Ser. No. 12/355,668, filed Jan. 16, 2009, titled "VPLS N-PE REDUNDANCY WITH STP ISOLATION," the disclosure of which is hereby incorporated by reference in its entirety.

BACKGROUND

1. Technical Field

The present disclosure relates generally to methods and apparatus for providing redundancy within physically separate networks through the use of separate spanning trees.

2. Description of the Related Art

Today, companies often have offices that are geographically dispersed. Each of these geographical locations typically supports a separate physical network. Each of these networks may provide access to data, applications, and other network resources. Such a network may be referred to as a "data center."

In order to support communication among multiple geographically dispersed networks, companies often support a single Virtual Local Area Network (VLAN). In order to support communication among the geographically dispersed networks, a single spanning tree generated via the Spanning Tree Protocol (STP) is often deployed for the VLAN over the geographically dispersed networks.

With the increase of globally dispersed offices, the number of data centers is increasing. Unfortunately, the STP may not be reliable over a large number of hops and logical interfaces.

DESCRIPTION OF EXAMPLE EMBODIMENTS

Figure 1:
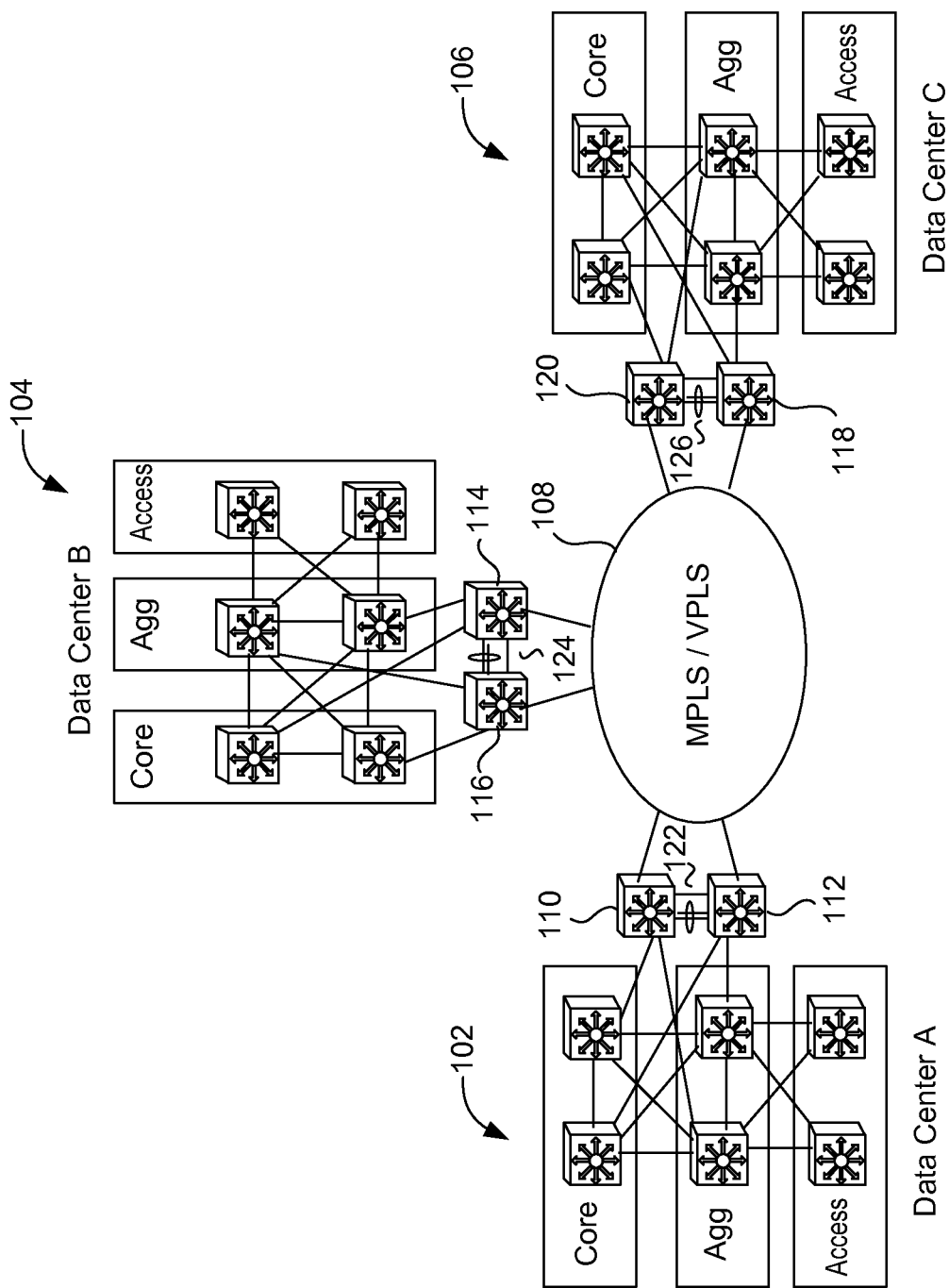
FIG. 1 is a block diagram illustrating an example network in which various embodiments of the invention may be implemented.

In the following description, numerous specific details are set forth in order to provide a thorough understanding of the disclosed embodiments. It will be obvious, however, to one skilled in the art, that the disclosed embodiments may be practiced without some or all of these specific details. In other instances, well-known process steps have not been described in detail in order not to unnecessarily obscure the disclosed embodiments.

Overview

In one embodiment, a system includes a first network, a second network, and a core network connecting the first network to the second network. The first network includes a first set of two or more network devices, wherein the first network has a first spanning tree associated therewith. Similarly, the second network includes a second set of two or more network devices, wherein the second network has a second spanning tree associated therewith, wherein the second spanning tree is separate from the first spanning tree.

Specific Example Embodiments

Adding redundancy to an extended layer 2 network (e.g., Ethernet network) is typically accomplished through the use of a spanning tree to keep the topology free from loops. The Spanning Tree Protocol (STP) is an Open System Interconnection (OSI) layer-2 protocol that ensures a loop-free topology for any bridged LAN. STP allows a network design to include redundant links to provide automatic backup paths if an active link fails, without the danger of bridge loops that may be created by backup links, or the need for manual enabling/disabling of these backup links. It is important to prevent bridge loops, since they result in flooding the network.

Generally, the STP creates a spanning tree within a mesh network of connected Layer-2 bridges (e.g., Ethernet switches), and disables those links that are not part of the tree, leaving a single active path between any two network nodes.

There are a number of problems associated with the use of a single spanning tree in association with an extended Layer 2 network that spans multiple remote locations. Specifically, the STP does not provide robustness for large scale Layer 2 deployments. By means of exchanging bridge protocol data units (BPDUs) between network devices (e.g., bridges), the STP elects the ports that eventually forward or block traffic.

Conservative default values for the STP timers typically impose a maximum network diameter of seven hops. Therefore, two bridges cannot be more than seven hops away from each other. When a BPDU propagates from the root bridge of the spanning tree toward leave bridges of the spanning tree, an age provided in an age field of the BPDU increments each time the BPDU traverses a bridge. Eventually, the bridge discards the BPDU when the age exceeds the maximum age. Accordingly, convergence of the spanning tree will be affected if the root bridge is too far away from some bridges in the network.

An aggressive value for the maximum age parameter and the forward delay can lead to a very unstable STP topology. In such cases, the loss of some BPDUs can cause a loop to appear.

Network stability may be compromised as a result of slow response to network failures (slow convergence). Specifically, the STP is not built to accommodate link flapping conditions, high error rates, uni-directional failures or non-report of loss of signal. These typical and frequent problems associated with long and medium distance links could lead to STP slow convergence or instability.

One of the reasons for multiple network sites such as multi-site data centers is disaster recovery. However, as data centers typically need Layer 2 connectivity, failure in one data center can affect other data centers, which could potentially lead to a black-out of all data centers at the same time.

Due to the scaling problem of the STP, the disclosed embodiments support a loop-free topology without the use of a spanning tree that spans multiple physical networks (e.g., data centers). This may be accomplished, in part, through the use of a separate spanning tree in association with each physical network (e.g., data center), rather than a single spanning tree that spans multiple physical networks. A loop-free topology may be maintained through the use of a communication protocol that ensures that only a single active path is present between any two network nodes. In the following description, a system architecture is set forth that enables multiple physical sites to be interconnected while ensuring a loop-free topology.

FIG. 1 is a diagram illustrating an example system in which various embodiments may be implemented. The system may include two or more physical networks. In this example, the system includes three networks (e.g., data centers). Specifically, the system includes a first network 102, Data Center A, a second network 104, Data Center B, and a third network 106, Data Center C. The networks 102, 104, and 106 are coupled to one another via a core network 108 (e.g., provider network), which may maintain its own spanning tree. The networks 102, 104, and 106 may be private networks, while the core network 108 may be a public network. The networks 102, 104, and 106 may be geographically separate such that they are coupled to one another through the core network 108.

The core network 108 may be a Virtual Private LAN Service (VPLS) network, which supports Ethernet based multipoint to multipoint communication over Internet Protocol (IP) and Multi Protocol Multiprotocol Label Switching (MPLS) networks. The VPLS allows geographically dispersed sites to share an Ethernet broadcast domain by connecting the sites through pseudo-wires. In a VPLS, Local Area Networks (LANs) at each site (e.g., represented by the networks 102, 104, and 106) may be extended to the edge of the provider network (e.g., represented by the core network 108). The provider network may then emulate a switch or bridge to connect all of the LANs to create a single bridged LAN.

As shown in this example, each of the networks 102, 104, and 106 may include a set of two or more network devices (e.g., bridges or routers). Specifically, each of the networks 102, 104, and 106 and corresponding set of network devices may include at least two redundant network devices (e.g., bridges or routers) connected to the core network 108. Since these redundant network devices are at the edge of the provider network, they may be referred to as Provider Edge (PE) devices (e.g., routers). As shown in FIG. 1, the first network 102 includes redundant network devices 110, 112, the second network 104 includes redundant network devices 114, 116, and the third network 106 includes redundant network devices 118, 120. The redundant network devices of each of the networks 102, 104, and 106 may each be connected to the core network 108, as shown. In this example, the networks 102, 104, and 106 are physical networks associated with separate physical sites. For instance, the networks 102, 104, and 106 may be storage area networks (SANs).

In accordance with one embodiment, each of the two redundant network devices of a particular physical network runs a communication protocol (e.g., redundancy protocol) such as a semaphore to prevent both of the two redundant network devices of the network from simultaneously being in an active state, as will be described in further detail below. Specifically, the semaphores of a particular physical network may be announced via at least one connection between the two redundant network devices of the physical network. In this example, the semaphores of the first network 102 may be announced via at least one connection between the two redundant network devices 110, 112 of the first network 102 as shown at 122. Similarly, the semaphores of the second network 104 may be announced via at least one connection between the two redundant network devices 114, 116 of the second network 104 as shown at 124, and the semaphores of the third network 106 may be announced via at least one connection between the two redundant network devices 118, 120 of the third network 106 as shown at 126.

At any given point in time, the redundant network devices of a particular physical network include a single active network device and at least one backup network device. In accordance with various embodiments, only one of the two redundant network devices forwards traffic to and from the physical network at a given point in time. The active network device and the backup network device of each of the networks 102, 104, and 106 may each be connected to the core network 108. In this example, the first network 102 has two redundant network devices 110, 112, the second network has two redundant network devices 114, 116, and the third network has two redundant network devices 118, 120. Specifically, the first network 102 includes an active network device 110 and a backup network device 112, the second network 104 includes an active network device 114 and a backup network device 116, and the third network 106 includes an active network device 118 and a backup network device 120.

It is important to note that should an active network device fail, the backup network device would take over for the active device. In other words, the backup network device would process traffic on behalf of the failed active device. The backup network device would then be considered the active device. Thus, a single network device may function as either a backup network device or an active network device at any given point in time.

An active network device may communicate with the backup network device via at least one connection between the active network device and the backup network device. In addition, the active network device may forward data packets to or from the core network 108 (e.g., between the core network 108 and the physical network). In accordance with one embodiment, traffic associated with the core network 108 cannot traverse the connection between the active network device and the backup network device.

In contrast, a backup network device (i.e., standby network device) may communicate with the active network device via at least one connection between the active network device and the backup network device. However, the backup network device may be incapable of forwarding data packets to or from the core network 108 (e.g., between the core network 108 and the physical network).

Each of the physical networks 102, 104, and 106 may have a separate spanning tree associated therewith. In accordance with one embodiment, a STP domain is limited to a physical network (e.g., data center). In other words, a spanning tree associated with a particular network is not associated with other networks. Moreover, the spanning tree is not connected to another spanning tree (e.g., associated with another network). The core network 108 need not implement a spanning tree.

The redundant network devices (e.g., bridges) of each of the physical networks 102, 104, and 106 may run the Spanning Tree Protocol. To break loops in a particular physical network (e.g., LAN) such as physical networks 102, 104, and 106, the redundant network devices (e.g., bridges) of that network may compute a spanning tree. The spanning tree allows a network to include redundant links to provide automatic backup paths if an active link fails, without the danger of bridge loops or the need for manual enabling/disabling of these backup links.

Another advantage of the use of separate spanning trees is the effect on Topology Change Notifications (TCNs). Typically, when a physical topology changes, STP convergence forces a TCN toward all domain switches. Since each physical network has a separate spanning tree domain, TCNs are no longer required when a problem occurs in another, potentially distant, domain. Rather, TCNs may be transmitted only within the local STP domain.

Figure 2:
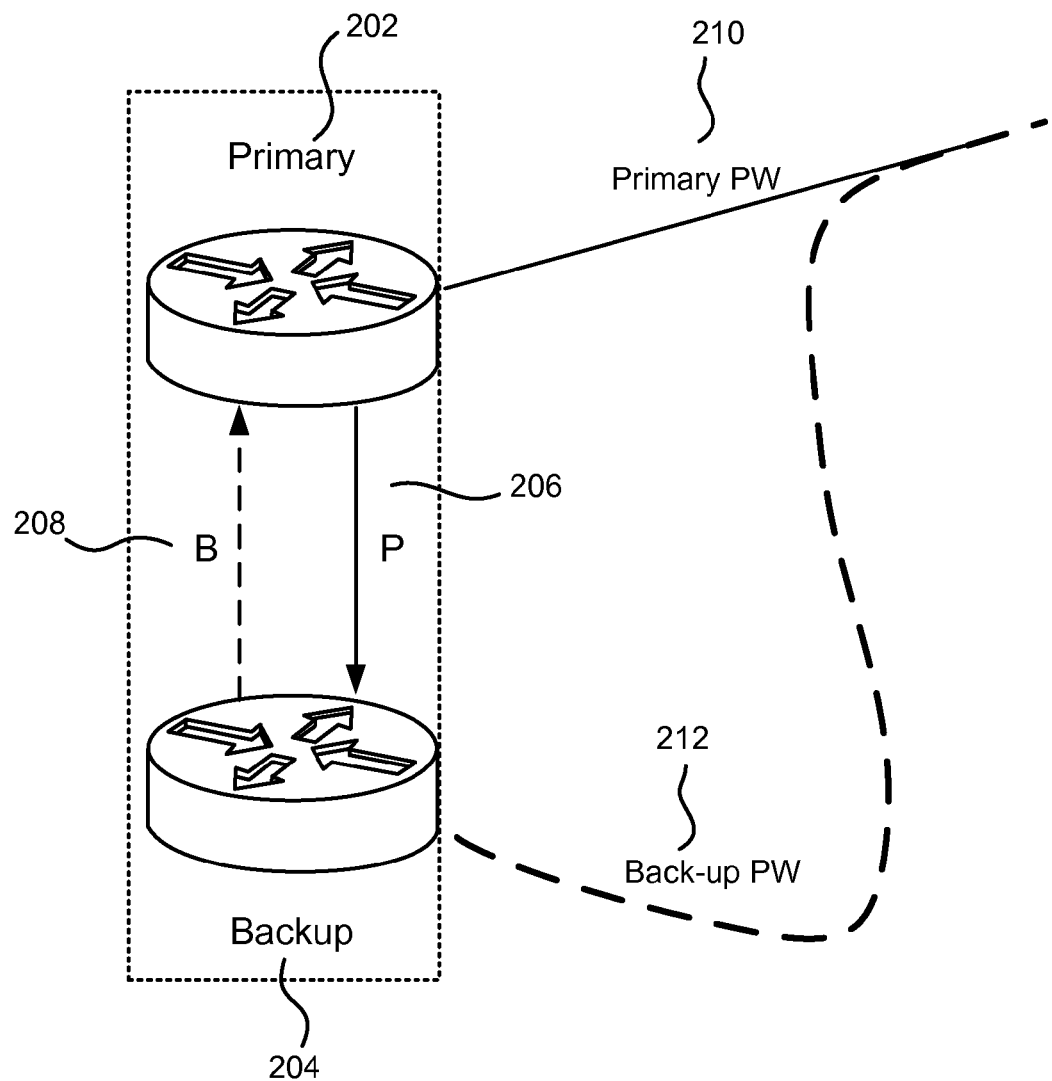
FIG. 2 is a diagram illustrating an example communication protocol that may be implemented by primary and backup network devices in accordance with various embodiments.

Within each physical network, two redundant network devices each run a communication protocol to prevent both of the redundant network devices from simultaneously being in an active state. FIG. 2 is a diagram illustrating an example communication protocol that may be implemented by primary 202 and backup 204 network devices in accordance with various embodiments. The communication protocol may be implemented by performing a two-way handshake. In accordance with one embodiment, the communication protocol may be implemented via semaphore signaling. Specifically, the primary network device 202 may implement a primary semaphore 206 and the backup network device 204 may implement a backup semaphore 208. Through implementing the primary semaphore 206 and the backup semaphore 208, packets may be forwarded to and from the core network via either a primary connection 210 between the primary network device 202 and the core network or a backup connection 212 between the backup network device 204 and the core network. The corresponding ports of the primary network device 202 and the backup network device 204 may be set to forward or block traffic accordingly, as will be described in further detail below with reference to FIG. 3.

Figure 3:
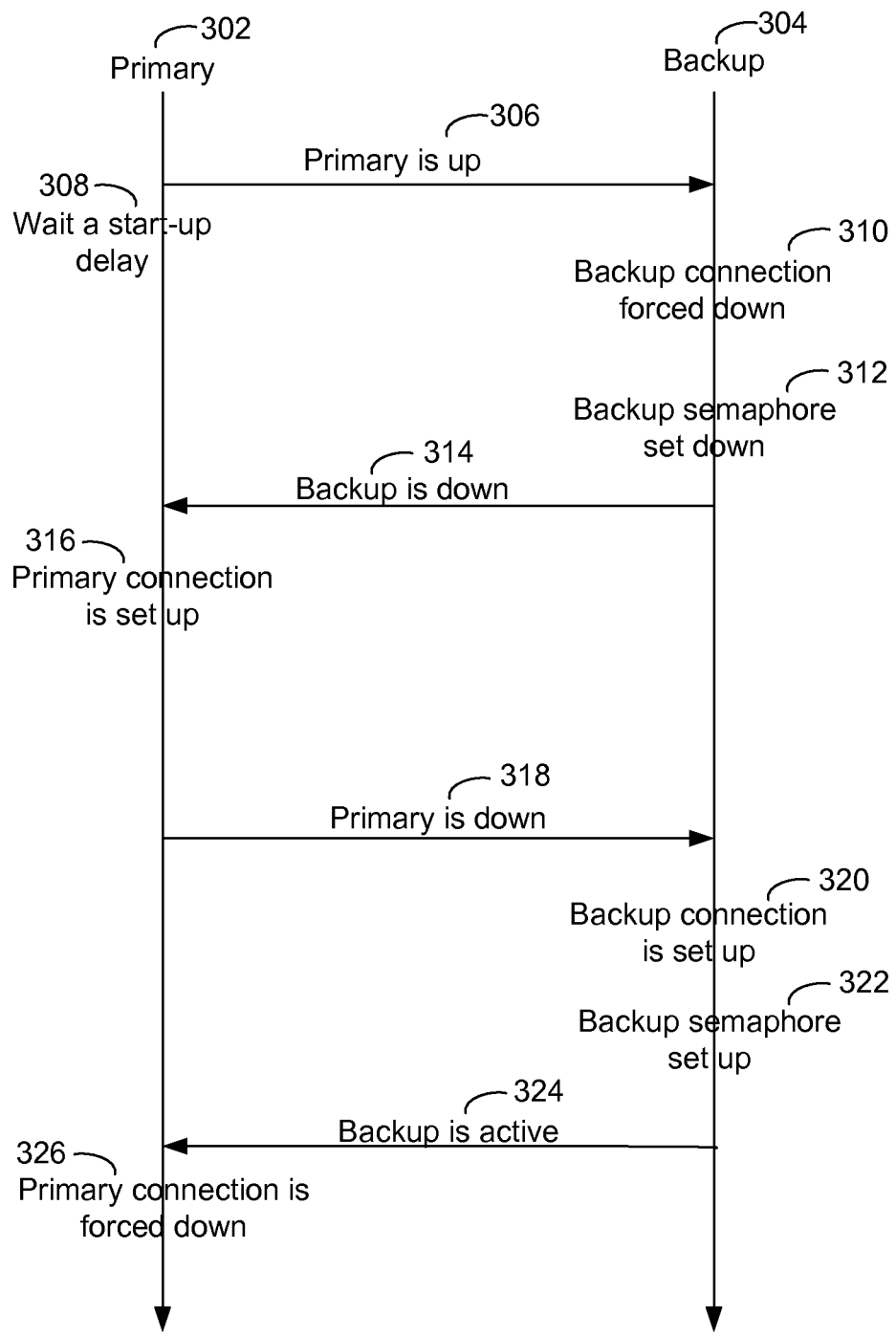
FIG. 3 is a transaction flow diagram illustrating an example communication protocol that may be implemented by primary and backup network devices in accordance with various embodiments.

FIG. 3 is a transaction flow diagram illustrating an example communication protocol that may be implemented by primary and backup network devices in accordance with various embodiments. Processes performed by the primary and backup network devices will be described with reference to vertical lines 302 and 304, respectively. The primary network device 302 may send a packet to the backup network device 304 indicating that the primary network device 302 is up (e.g., active) as shown at 306. The primary network device 302 may wait a start-up delay at 308.

Upon receiving the packet indicating that the primary is up at 306, the backup network device 304 may force the backup connection (e.g., port) to the core network down at 310 such that traffic to and from the core network via the backup network device 304 is blocked. The backup network device 304 may set the backup semaphore down at 312, and the backup network device 304 may send a packet to the primary network device 302 indicating that the backup network device 304 is down as shown at 314. Once the primary network device 302 receives the packet confirming that the backup network device 304 is not forwarding traffic, the primary network device 302 sets the primary connection (e.g., port) up at 316 such that traffic to and from the core network (e.g., between the core network and the physical network) is forwarded via the primary network device 302.

In the event that a failure occurs in the primary network device 302, this forces the primary connection down. More specifically, this is accomplished by forcing the semaphore of the primary network device 302 down. Through the use of a communication protocol such as the semaphore described herein, only a single active network device will be in communication with the core network.

Upon receiving a packet indicating that the primary is down at 318, the backup network device 304 may set up the backup connection (e.g., port) to the core network at 320 such that traffic to and from the core network via the backup network device 304 is not blocked. The backup network device 304 may set up the backup semaphore at 322, and the backup network device 304 may send a packet to the primary network device 302 indicating that the backup network device 304 is active as shown at 324. Once the primary network device 302 receives the packet confirming that the backup network device 304 is active (e.g., forwarding traffic), the primary network device 302 forces the primary connection (e.g., port) down at 326 such that traffic to and from the core network (e.g., between the core network and the physical network) is not forwarded via the primary network device 302.

Each of the redundant network devices associated with a particular physical network may be configured with semaphores supporting operation as both a primary network device and a backup network device. This enables a backup network device to act as an active network device in the event of failure of the backup network device. Moreover, once a failed active network device is brought up, it may act as a backup network device.

Generally, the techniques for performing the disclosed embodiments may be implemented on software and/or hardware. For example, they can be implemented in an operating system kernel, in a separate user process, in a library package bound into network applications, on a specially constructed machine, or on a network interface card. In a specific embodiment of this invention, the techniques of the present invention are implemented in software such as an operating system or in an application running on an operating system.

A software or software/hardware hybrid packet processing system of this invention may be implemented on a general-purpose programmable machine selectively activated or reconfigured by a computer program stored in memory. Such programmable machine may be a network device designed to handle network traffic. Such network devices typically have multiple network interfaces including frame relay and ISDN interfaces, for example. Specific examples of such network devices include routers and switches. A general architecture for some of these machines will appear from the description given below. Further, various embodiments may be at least partially implemented on a card (e.g., an interface card) for a network device or a general-purpose computing device.

Figure 4:
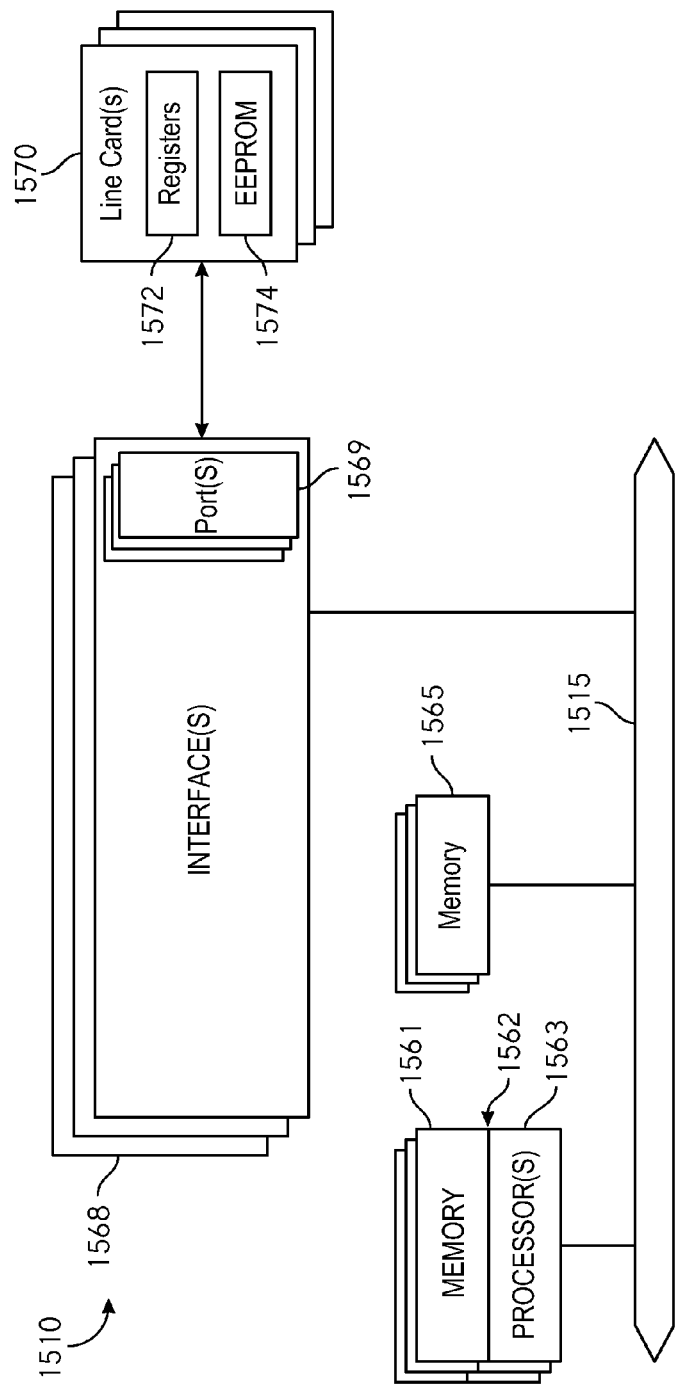
FIG. 4 is a diagrammatic representation of an example network device in which various embodiments may be implemented.

The disclosed embodiments may be implemented at network devices such as switches or routers. Referring now to FIG. 4, a router or switch 1510 suitable for implementing embodiments of the invention includes a master central processing unit (CPU) 1562, one or more interfaces 1568, and a bus 1515 (e.g., a PCI bus). When acting under the control of appropriate software or firmware, the CPU 1562 is responsible for such router tasks as routing table computations and network management. It may also be responsible for implementing the disclosed embodiments, in whole or in part. The router may accomplish these functions under the control of software including an operating system (e.g., the Internetwork Operating System (1OS®) of Cisco Systems, Inc.) and any appropriate applications software. CPU 1562 may include one or more processors 1563 such as a processor from the Motorola family of microprocessors or the MIPS family of microprocessors. In an alternative embodiment, the one or more processors 1563 are specially designed hardware for controlling the operations of router 1510. In a specific embodiment, a memory 1561 (such as non-volatile RAM and/or ROM) also forms part of CPU 1562. However, there are many different ways in which memory could be coupled to the system. Memory block

1561 may be used for a variety of purposes such as, for example, caching and/or storing data, programming instructions, etc.

The one or more interfaces 1568 with one or more ports 1569 are typically provided for one or more line cards 1570 (sometimes referred to as "interface cards"). In some embodiments, the one or more linecards 1570 include memory such as registers 1572 and EEPROM 1574. Generally, the one or more linecards 1570 control the sending and receiving of data packets or data segments over the network and sometimes support other peripherals used with the router 1510. Among the interfaces that may be provided are Ethernet interfaces, frame relay interfaces, cable interfaces, DSL interfaces, token ring interfaces, and the like. In addition, various very high-speed interfaces may be provided such as fast Ethernet interfaces, Gigabit Ethernet interfaces, ATM interfaces, HSSI interfaces, POS interfaces, FDDI interfaces, LAN interfaces, WAN interfaces, metropolitan area network (MAN) interfaces and the like. Generally, these interfaces may include ports appropriate for communication with the appropriate media. In some cases, they may also include an independent processor and, in some instances, volatile RAM. The independent processors may control such communications intensive tasks as packet switching, media control and management. By providing separate processors for the communications intensive tasks, these interfaces allow the master microprocessor 1562 to efficiently perform routing computations, network diagnostics, security functions, etc. Although the system shown in FIG. 4 is one specific router of the present invention, it is by no means the only router architecture on which the disclosed embodiments can be implemented. For example, an architecture having a single processor that handles communications as well as routing computations, etc. is often used. Further, other types of interfaces and media could also be used with the router.

Regardless of network device's configuration, it may employ one or more memories or memory modules (such as, for example, memory block 1565) configured to store data, program instructions for the general-purpose network operations and/or the inventive techniques described herein. The program instructions may control the operation of an operating system and/or one or more applications, for example.

Because such information and program instructions may be employed to implement the systems/methods described herein, the disclosed embodiments relate to machine readable media that include program instructions, state information, etc. for performing various operations described herein. Examples of machine-readable media include, but are not limited to, magnetic media such as hard disks, floppy disks, and magnetic tape; optical media such as CD-ROM disks and DVDs; magneto-optical media such as floptical disks; and hardware devices that are specially configured to store and perform program instructions, such as read-only memory devices (ROM) and random access memory (RAM). Examples of program instructions include both machine code, such as produced by a compiler, and files containing higher level code that may be executed by the computer using an interpreter.

Although illustrative embodiments and applications of the disclosed embodiments are shown and described herein, many variations and modifications are possible which remain within the concept, scope, and spirit of the embodiments of the invention, and these variations would become clear to those of ordinary skill in the art after perusal of this application. For example, the various examples described herein relate to the use of semaphores by the redundant network devices to ensure that only one of the redundant network devices is active at any given point in time. However, the disclosed embodiments may also be performed using other redundancy protocols or signaling mechanisms. Moreover, the disclosed embodiments need not be performed using the steps described above. Accordingly, the present embodiments are to be considered as illustrative and not restrictive, and the disclosed embodiments are not to be limited to the details given herein, but may be modified within the scope and equivalents of the appended claims.

What is claimed is:

1. A system comprising:
   a first computer network including a first plurality of network devices, wherein the first computer network has a first spanning tree associated therewith;
   a second computer network including a second plurality of network devices, wherein the second computer network has a second spanning tree associated therewith, wherein the second spanning tree is separate from the first spanning tree;
   wherein a core network connects the first computer network to the second computer network;
   wherein a first network device of the first computer network is connected to a second network device of the first computer network over an inter-device link, wherein traffic to and from the core network cannot be transmitted on the inter-device link; and
   wherein the first and second network devices are configured to:
      set, by the first network device, a primary semaphore associated with the first network device to an inactive state in response to a failure of the first network device;
      send, by the first network device, a first packet to the second network device via the inter-device link indicating that the the first network device is down in response to the failure of the first network device;
      set up, by the second network device, a second connection port connecting the second network device to the core network in response to receiving the first packet, thereby permitting traffic to and from the core network to be forwarded via the second network device;
      set, by the second network device, a backup semaphore associated with the second network device to an active state in response to receiving the first packet;
      send, by the second network device, a second packet to the first network device via the inter-device link indicating that the second network device is in the active state; and
      force down, by the first network device, a first connection port connecting the first network device to the core network in response to receiving the second packet, thereby blocking traffic to and from the core network via the first network device.

2. The system of claim 1, wherein the core network is a public network.

3. The system of claim 1, wherein the first network device runs the primary semaphore and the second network device runs the backup semaphore to prevent both of the first and second network devices from simultaneously being in the active state.

4. The system of claim 1, wherein the primary semaphore and the backup semaphore are announced via the inter-device link.

5. The system of claim 1, wherein each of the first and second network devices runs a redundancy protocol to prevent both of the first and second network devices from simultaneously operating in the active state.

6. The system of claim 1, wherein, after resolving the failure of the first network device, the first network device is operated in a backup mode.

7. A method comprising:
setting, by a first network device of a first computer network, a primary semaphore associated with the first network device to an inactive state in response to a failure of the first network device, wherein the first computer network includes a plurality of network devices including the first network device and a second network device, wherein the first and second network devices are each communicatively coupled to a core network, and wherein the first and second network devices are communicatively coupled via an inter-device link over which traffic to and from the core network cannot be transmitted;
sending, by the first network device, a first packet to the second network device via the inter-device link indicating that the first network device is down in response to the failure of the first network device;
setting, by the second network device, a backup semaphore associated with the second network device to an active state in response to receiving the first packet;
setting up, by the second network device, a second connection port connecting the second network device to the core network in response to receiving the first packet, thereby permitting traffic to and from the core network to be forwarded via the second network device;
sending, by the second network device, a second packet to the first network device over the inter-device link indicating that the second network device is in the active state; and
forcing down, by the first network device, a first connection port connecting the first network device to the core network in response to receiving the second packet, thereby blocking traffic to and from the core network via the first network device.

8. The method of claim 7, wherein the core network is a public network.

9. The method of claim 7, wherein the first computer network has a spanning tree associated therewith that is not associated with any other networks.

10. The method of claim 7, wherein the first computer network has a spanning tree associated therewith that is separate from a spanning tree associated with a second computer network connected to the core network.

11. The method of claim 7, wherein the second network device runs the backup semaphore to prevent both of the first and second network devices from simultaneously being in the active state.

12. The method of claim 7, wherein each of the first and second network devices runs a redundancy protocol to prevent both of the first and second network devices from simultaneously operating in the active state.

13. The method of claim 7, wherein, after resolving the failure of the first network device, the first network device is operated in a backup mode.

14. A non-transitory computer readable storage medium including one or more programs, which, when executed by one or more processors of a first network device of a first computer network and one or more processors of a second network device of the first computer network, cause the first and second network devices to:
set, by the first network device, a primary semaphore associated with the first network device to an inactive state in response to a failure of the first network device, wherein the first and second network devices are each communicatively coupled to a core network, and wherein the first and second network devices are communicatively coupled via an inter-device link over which traffic to and from the core network cannot be transmitted;
send, by the first network device, a first packet to the second network device via the inter-device link indicating that the first network device is down in response to the failure of the first network device;
set up, by the second network device, a second connection port connecting the second network device to the core network in response to receiving the first packet, thereby permitting traffic to and from the core network to be forwarded via the second network device;
set, by the second network device, a backup semaphore associated with the second network device to an active state in response to receiving the first packet;
send, by the second network device, a second packet to the first network device via the inter-device link indicating that the second network device is in the active state; and
force down, by the first network device, a first connection port connecting the first network device to the core network in response to receiving the second packet, thereby blocking traffic to and from the core network via the first network device.

15. The non-transitory computer readable storage medium of claim 14, wherein the core network is a public network.

16. The non-transitory computer readable storage medium of claim 14, wherein the first computer network has a spanning tree associated therewith that is not associated with any other networks.

17. The non-transitory computer readable storage medium of claim 14, wherein each of the first and second network devices runs a redundancy protocol to prevent both of the first and second network devices from simultaneously operating in the active state.

18. The non-transitory computer readable storage medium of claim 14, wherein the first network device runs the primary semaphore and the second network device runs the backup semaphore to prevent both of the first and second network devices from simultaneously being in the active state.

19. The non-transitory computer readable storage medium of claim 14, wherein, after resolving the failure of the first network device, the first network device is operated in a backup mode.

20. The non-transitory computer readable storage medium of claim 14, wherein the primary semaphore and the backup semaphore are announced via the inter-device link.

* * * * *